(No Model.)
C. A. JACKSON.
SYSTEM OF ELECTRIC CONDUCTORS FOR ELECTRIC CARS.
No. 411,989. Patented Oct. 1, 1889.
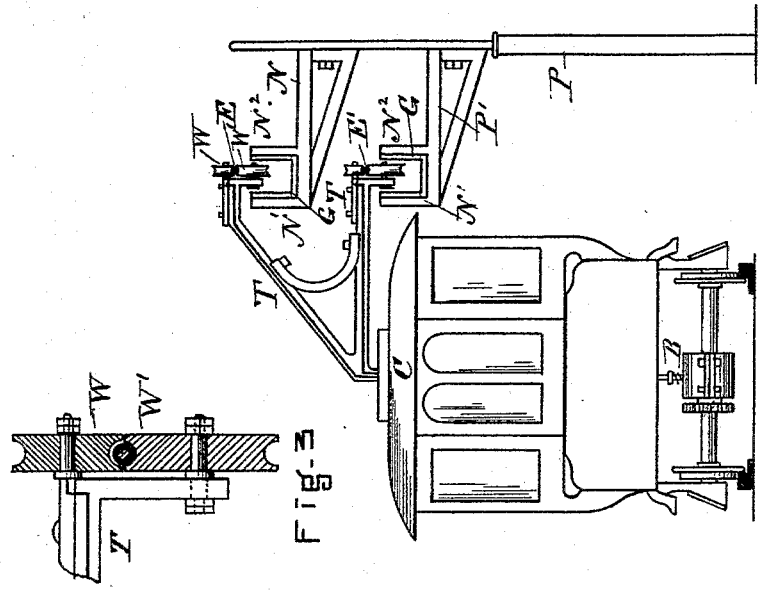
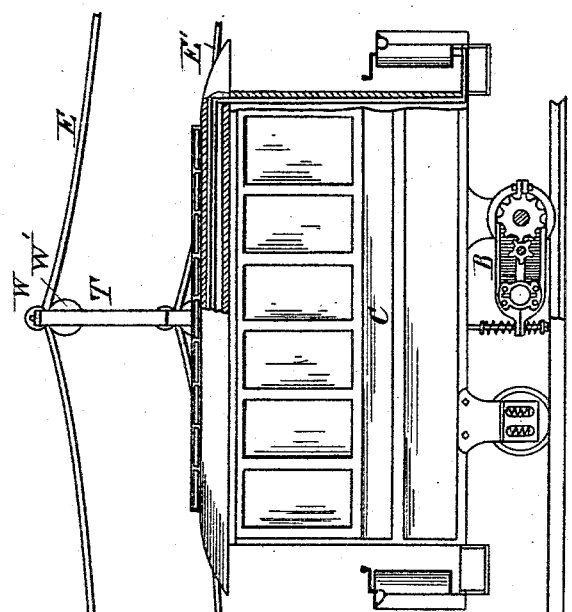
WITNESSES.
Frank G. Parker
Matthew M. Blunt
INVENTOR.
Charles Almon Jackson

UNITED STATES PATENT OFFICE.

CHARLES ALMON JACKSON, OF BILLERICA, MASSACHUSETTS.

SYSTEM FOR ELECTRIC CONDUCTORS FOR ELECTRIC CARS.

SPECIFICATION forming part of Letters Patent No. 411,989, dated October 1, 1889.

Application filed April 20, 1889. Serial No. 308,015. (No model.)

*To all whom it may concern:*

Be it known that I, CHARLES ALMON JACKSON, of Billerica, in the county of Middlesex and State of Massachusetts, have invented certain new and useful Improvements in Systems for Electric Conductors for Electric Cars, of which the following, taken in connection with the accompanying drawings, is a specification.

The object of my invention is to so construct and arrange electric conduits and electric-car trolleys that complete overhead metallic circuits may be established. This object I attain by the mechanism shown in the accompanying drawings, in which—

Figure 1 shows an electric car in side elevation, together with line-posts and the two wires that, together with the trolley-wires, make a complete metallic circuit between the motor in the car and the generator. Fig. 2 shows the same in end elevation. Fig. 3 is a detail showing the trolley-wheels.

Heretofore it has been usual to use a single overhead wire connected by a trolley-wire to the motor, the return-current passing through a collector that brushes along on one of the rails of the track, which serves as an electrode for completing the circuit; also, two overhead tubes fixed at intervals, the connection being by trolleys with friction-connectors rubbing on the under side only of the tubes or electrodes; also, to construct an underground conduit in which two electrodes—one insulated from the other—were used. In practice all of these systems have proved more or less uncertain and require too nice adjustments for practical service. By arranging a complete metallic overhead circuit and connecting the same to the motor by trolleys I am enabled to overcome the objections due to the other systems.

I will now describe my system.

In the drawings, C represents the car, and B the motor. The poles P, which support the wire, may be of any construction, except that they are each provided with two bracket-arms P' and N, each of which has near its end uprights N' N², Fig. 1, which serve to keep the wire E and E' from getting out of place. For more perfect insulation, I place inside a casing of glass G, or of some other good insulating material.

The trolleys T T may be made as shown, or in any desired style. At the end of each trolley I have two grooved wheels W W'. The wheels W and W' are so placed and made that the wire E or E', as the case may be, is securely held between them, the edges of the grooves in the wheels being in contact, or nearly so, with each other—that is, the two wheels W and W' are in contact with each other while the wire is loose in the groove between them, as shown in Figs. 2 and 3.

The wheels W W' of one of the trolleys are electrically connected with one pole of the motor, while the wheels W W' of the other trolley are connected with the other pole of the motor, so that a complete metallic circuit may be established between the motor and the generator.

The supporting-brackets N and P' are all somewhat lower than the lower wheel of their respective trolleys, so that as the trolleys come to the brackets they lift their wire off from the bracket and pass over, dropping the wire as they pass away from the bracket, so that the wires always rest upon the bracket, except when the trolley-wheels lift them.

I claim—

In a system for electric conductors for cars, the combination of the double-armed trolley T T, extending laterally from the car and having trolley-wheels, as described, with the conducting-wires and with supporting-brackets, substantially as and for the purpose set forth.

CHARLES ALMON JACKSON.

Witnesses:
FRANK G. PARKER,
MATTHEW M. BLUNT.